Sept. 2, 1969   A. C. HARRIMAN ET AL   3,464,382
MACHINE FOR APPLYING COATING MATERIAL TO A WORKPIECE
Filed March 13, 1967   7 Sheets-Sheet 1

FIG.-1

INVENTORS
Allen C. Harriman
Charles A. Robinson

BY   Albert Jordon

ATTORNEY

United States Patent Office 3,464,382
Patented Sept. 2, 1969

3,464,382
MACHINE FOR APPLYING COATING MATERIAL TO A WORKPIECE
Allen C. Harriman, Brockton, and Charles A. Robinson, Waltham, Mass., assignors to Jacob S. Kamborian, West Newton, Mass.
Filed Mar. 13, 1967, Ser. No. 622,517
Int. Cl. B05c 1/02, 1/08; B41l 13/02
U.S. Cl. 118—406                             13 Claims

ABSTRACT OF THE DISCLOSURE

An apparatus for coating a portion of a workpiece with stiffening material. The workpiece is supported over a hole in a flexible mask. A resilient pad having an upwardly concave mount bears against the top of the workpiece and overlies a hole in the mask. A suction force applied through the mound causes the portion of the workpiece that is over the mask hole to bear against the mound. An applicator is caused to move along the bottom of the mask and across the mask hole in a work stroke. Coating material is forced from the applicator during the work stroke to enable the applicator to scrape the coating material into the mask hole and fill up the space within the mound with the coating material adhering to the workpiece. A roll is mounted to bear against the mask during the applicator movement to prevent buckling of the mask. A pumping mechanism is incorporated in the mechanism for forcing the coating material through the applicator during the work stroke.

In the manufacture of shoes, it is accepted practice to stiffen the heel end of the shoe by means of a counter stiffener attached to the heel portion of the shoe upper and to stiffen the toe end of the shoe by means of a box toe stiffener attached to the toe portion of the shoe upper.

One mode of forming the counter or box toe is to apply a coating of molten thermoplastic stiffening material to a shoe component so as to enable the stiffening material to adhere to the shoe component. One aspect of this invention relates to a machine for applying the coating to the workpiece, formed of the shoe component, so that the coating has the desired predetermined contour and the desired cross-sectional configuration. The machine includes a mask, upon which the workpiece is supported, having an opening corresponding in shape to the desired contour of the stiffener, a resilient deformable pad which is caused to hold the workpiece against the mask, a means for drawing the portion of the workpiece above the mask opening upwardly into a mound to provide a space between the mask and the mound whose cross-section corresponds to the desired cross-sectional configuration of the stiffener, a means for causing the portion of the workpiece that lies above the mask opening to bear against the bottom of the mound and a means to apply the coating material into the mask opening so that it may fill the space within the mask opening and adhere to the portion of the workpiece bearing against the mound.

The mask is made of a thin flexible material in order to minimize the thickness of the periphery of the coating that is applied to the workpiece. The means to apply the coating material into the mask opening includes an applicator that moves in a work stroke along the bottom of the mask and beneath the pad in such a path as to cross the mask opening. In order to prevent buckling of the mask during the work stroke of the applicator, in a further aspect of the invention the machine includes a presser member mounted to move in unison with the applicator so as to bear against the bottom of the mask during the work stroke.

Figure 1:
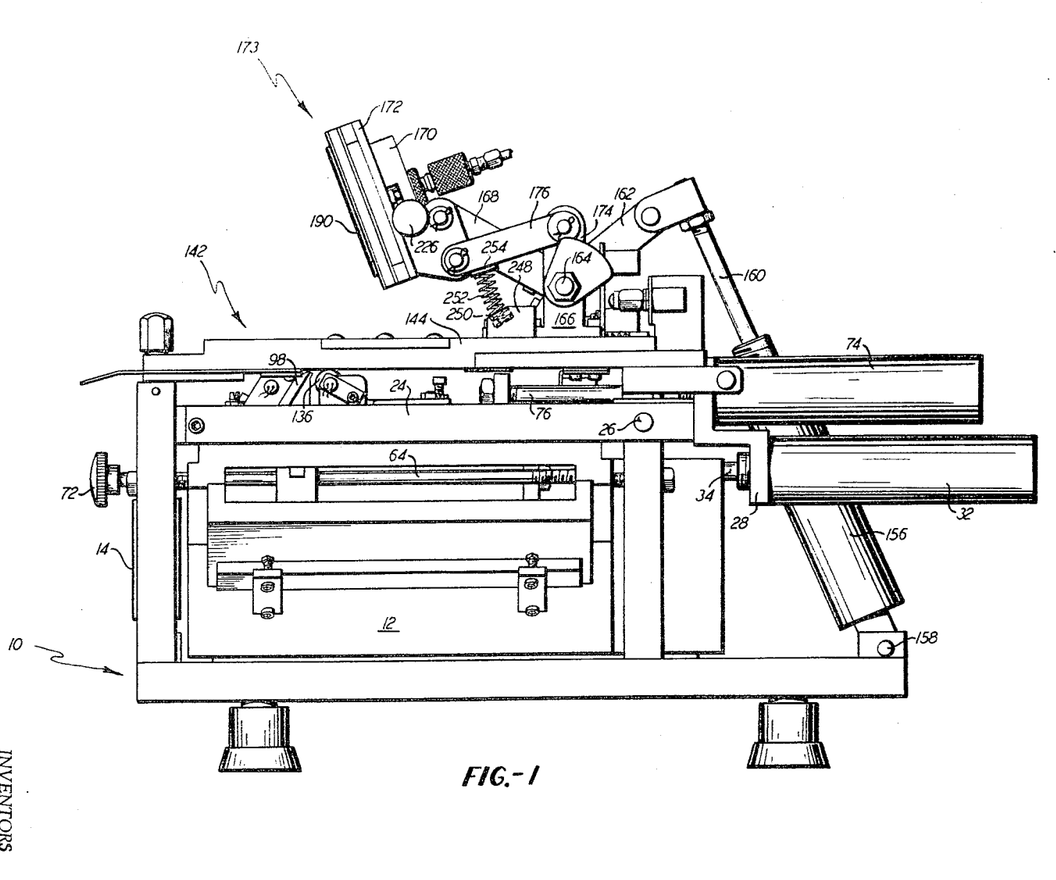
FIGURE 1 is a side elevation of the machine.
Figure 2:
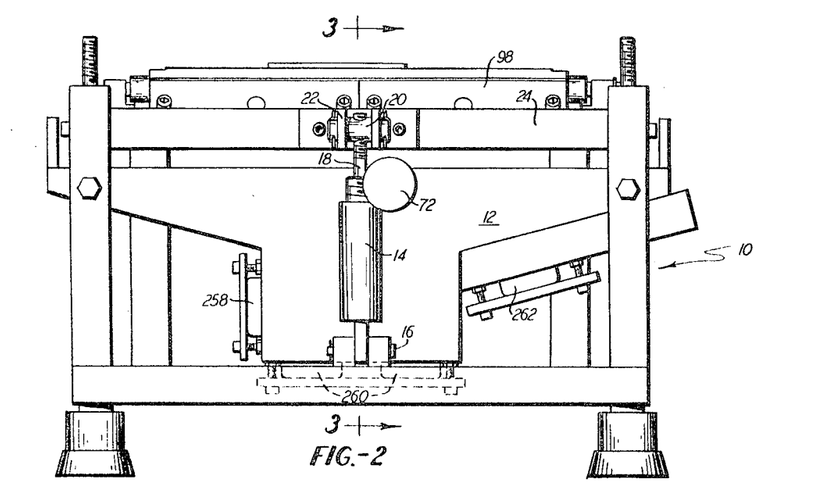
FIGURE 2 is a front elevation of a main frame of the machine.

The machine comprises a main frame 10 having a tank 12 rigidly secured thereto. The operator is intended to stand to the left of the machine as seen in FIGURE 1, and a direction extending from right to left as seen in FIGURE 1 will be referred to as "forward" while a direction extending from left to right as seen in FIGURE 1 will be referred to as "rearward."

Referring to FIGURES 1–3 and 5, an air operated motor 14 is pivoted to the front of the frame 10 on a pin 16. The upwardly extending piston rod 18 of the motor 14 is secured to a rod 20, and the rod 20 is rotatably mounted in a pair of ears 22 that are secured to and extend forwardly of a sub-frame 24. The sub-frame 24 is pivotally mounted on a pair of pins 26 mounted to the main frame 10 for swinging movement about the horizontal axes of these pins.

A flange 28 is welded to a bar 30 that is at the rear of the sub-frame 24. An air actuated motor 32, secured to the flange 28, has a forwardly directed piston rod 34 that extends over the tank 12. A brace 36 is welded to the bar 30 and extends downwardly into the tank 12. A block 38 (FIGURES 3 and 4), secured to the bottom of the brace 36, has a transversely extending hole 40 therein that is closed at its ends. A pair of laterally spaced tubes 42 and 44, threaded into the block 38, respectively have holes 46 and 48 that are each in communication with an end of the hole 40. A brace 50, secured to the front of the piston rod 34, extends downwardly into the tank 12. The bottom of the brace 50 is secured to a hollow sleeve 52 (FIGURES 3, 4 and 9) that is slidably mounted on the tube 42. A port 54 provides communication between the tank 12 and the hollow interior 56 of the sleeve 52. A ball valve 58 is mounted in the sleeve 52 for movement between a valve seat 60 and a pin 62 that straddles the hollow sleeve interior 56. When seated against the valve seat 60, the ball 58 blocks flow of liquid through the port 54. When the ball 58 is bearing against the pin 62, liquid may flow through the port 54 and around the ball 58.

Figure 3:
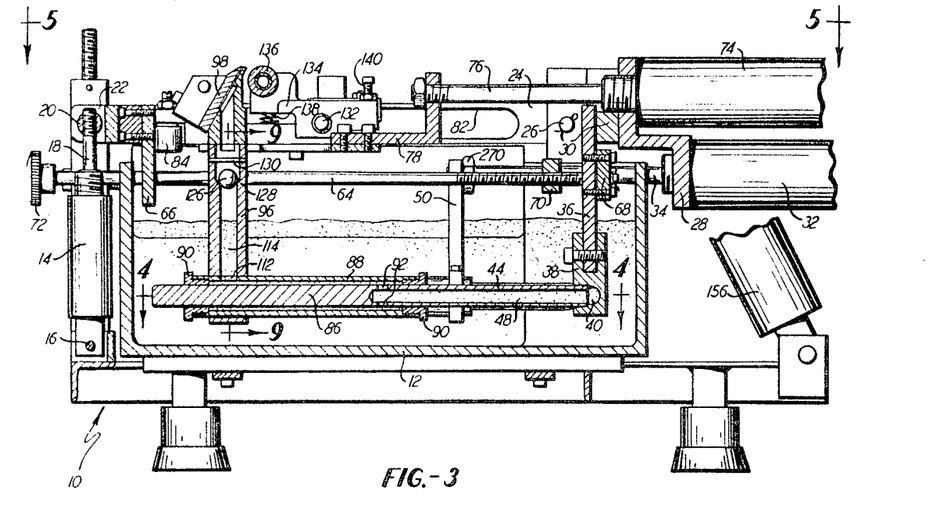
FIGURE 3 is a section taken on the line 3—3 of FIGURE 2.
Figure 5:
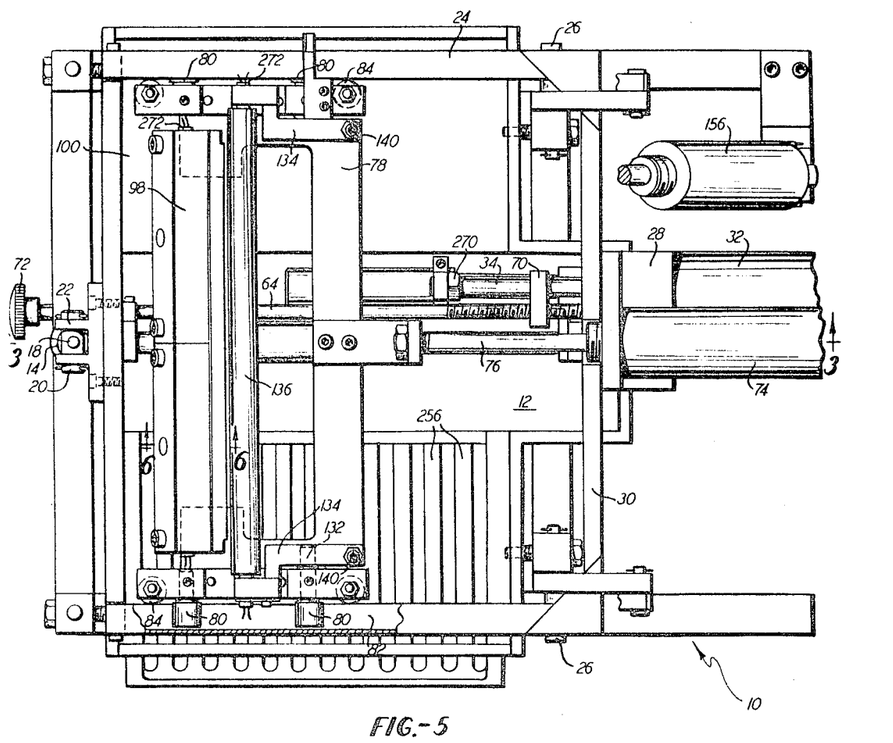
FIGURE 5 is a view taken on the line 5—5 of FIGURE 3.
Figure 6:
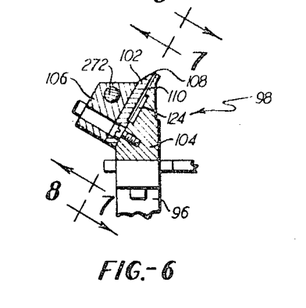
FIGURE 6 is a section taken on the line 6—6 of FIGURE 5.
Figure 7:
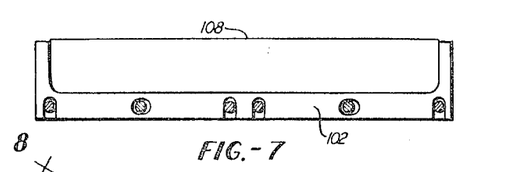
FIGURE 7 is a view taken on the line 7—7 of FIGURE 6.
Figure 8:
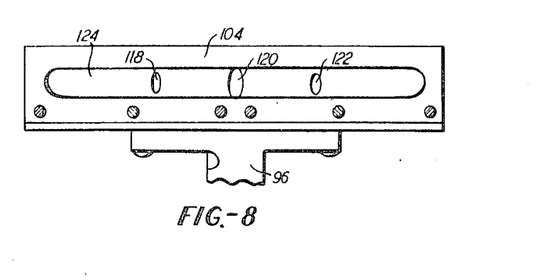
FIGURE 8 is a view taken on the line 8—8 of FIGURE 6.

Referring to FIGURES 3 and 5, a rod 64 is rotatably mounted to and extends between a hanger 66 secured to the front of the sub-frame 24 and a bar 68 secured to the brace 36. A stop member 70 is threaded onto the bar 64 and is slidably mounted on the piston rod 34. Rotation of the rod 64, by means of a knob 72 secured to its front end, will therefore adjust the position of the stop member 70 in forward-rearward directions along the piston rod 34.

An air actuated motor 74, secured to the flange 28, has a forwardly extending piston rod 76. As seen in FIGURES 3 and 5, the piston rod 76 is secured to an applicator mount 78. The applicator mount 78 is mounted for forward-rearward movement in the sub-frame 24 by means of rolls 80 on the applicator mount that are received in tracks 82 in the sub-frame and rolls 84 that bear against the sub-frame walls.

Figure 4:
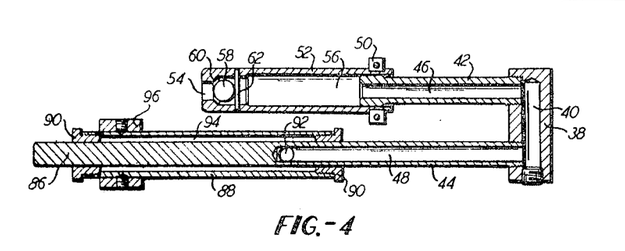
FIGURE 4 is a section taken on the line 4—4 of FIGURE 3.
Figures 9, 15:
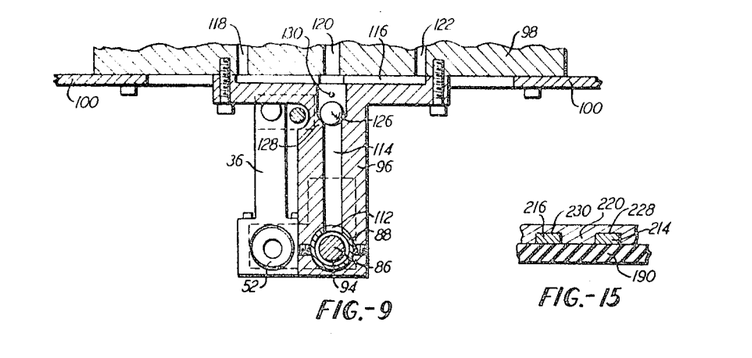
FIGURE 9 is a section taken on the line 9—9 of FIGURE 3.
FIGURE 15 is a section taken on the line 15—15 of FIGURE 14.

Referring to FIGURES 3, 4 and 9, the hole 48 terminates rearwardly of the front end of the tube 44 to provide a solid portion 86 for the tube 44 between the front of this tube and the hole 48. A sleeve 88 is slidably mounted on the tube 44 by means of end caps 90 that are threaded into the ends of the sleeve and are snugly mounted to the tube for sliding movement. Radial ports 92 provide communication between the front end of the hole 48 and an annular chamber 94 that is between the tube 44 and the sleeve 88. The sleeve 88 is secured to the bottom of a base 96, and the top of the base 96 is bolted to an applicator 98. The applicator 98 is also bolted to a pair of flanges 100 (FIGURES 5 and 9) that form a part of the applicator mount 78.

As seen in FIGURES 6-9, the applicator 98 comprises a blade 102 that is clamped between a bracket 104 and a cap 106. The blade 102 terminates in a sharp scraping edge 108, and a space 110 is provided between the blade 102 and the bracket 104. The sleeve 88 has a port 112 (FIGURES 3 and 9) that provide communication between the annular chamber 94 and a passage 114 in the base 96. The passage 114 intersects a cut-out 116 in the top of the base 96, and the cut-out 116 is in communication with passages 118, 120 and 122 in the bracket 104. The passages 118, 120 and 122 intersect a cut-out 124 in the bracket 104 and the cut-out 124 is in communication with the space 110. A ball valve 126 in the passage 114 is movable between a valve seat 128 and a pin 130 extending across the passage. In the former position the ball 126 blocks the passage 114 and in the latter position fluid may move through the passage 114 around the ball 126.

Referring to FIGURES 3 and 5, the back roll 80 on each side of the applicator mount 78 is rotatably mounted in the applicator mount by means of a shaft 132. The shafts 132 extend inwardly of the periphery of the applicator mount and a bracket 134 is pivoted to each shaft 132. A presser member, that takes the form of a roll 136, is rotatably mounted to and extends between the brackets 134. The roll 136 is located adjacent to and rearwardly of the applicator 98 and is yieldably urged upwardly by a compression spring 138 interposed between each bracket 134 and the applicator mount 78. A bolt 140, extending through each bracket 134, is adapted to bear against the applicator mount 78 and thereby limit the extent to which the springs 138 can yieldably urge the roll 136 upwardly.

Figure 16:
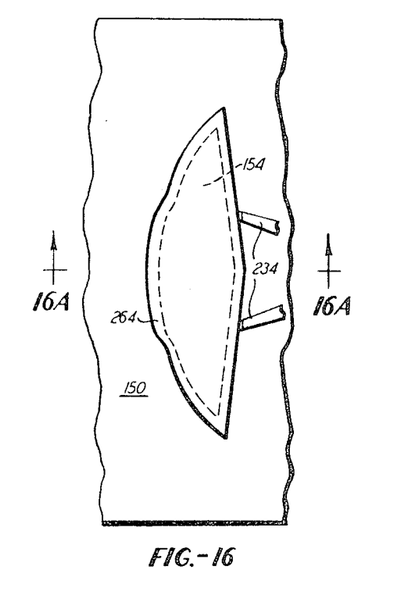
FIGURE 16 is a representation of a workpiece in the machine at the beginning of the machine cycle.
Figure 16A:
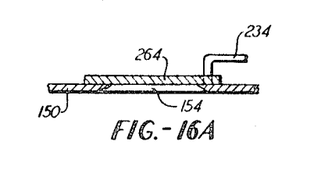
FIGURE 16A is a view taken on the line 16A—16A of FIGURE 16.

A work frame 142 (FIGURES 1, 10 and 11) is secured to the top of the main frame 10. The work frame 142 includes a rectangular opening defined by a pair of side bars 144, an apron 146 and a plate 148. A mask 150, made of thin flexible sheet steel, extends across the opening and is clamped against the apron 146 by clamps 152. The mask has an opening 154 (FIGURES 16, 16A and 17) having a predetermined contour for purposes that are explained below.

Figure 10:
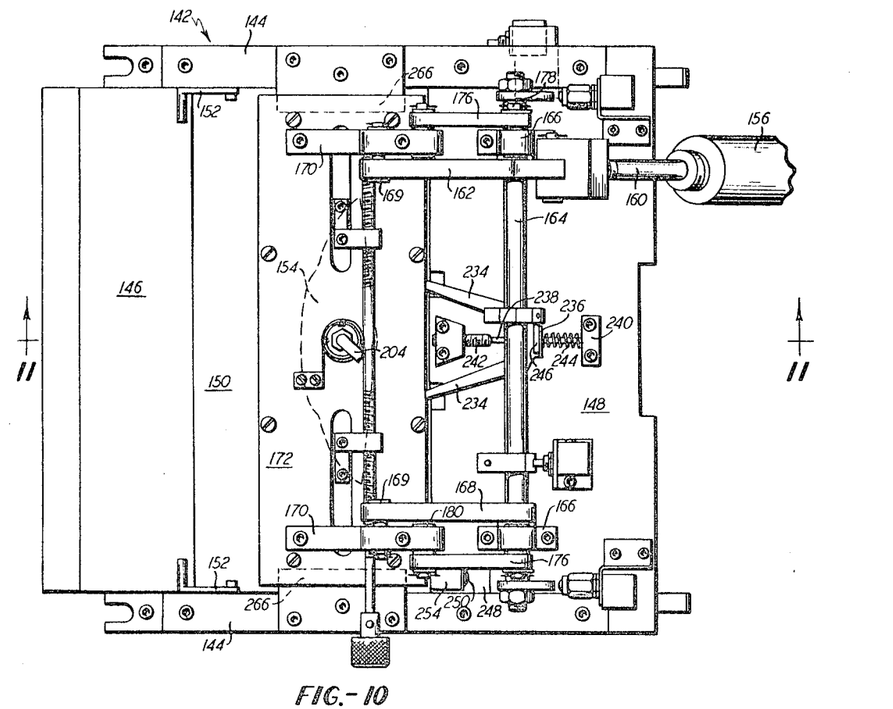
FIGURE 10 is a plan view of a work frame of the machine.
Figure 11:
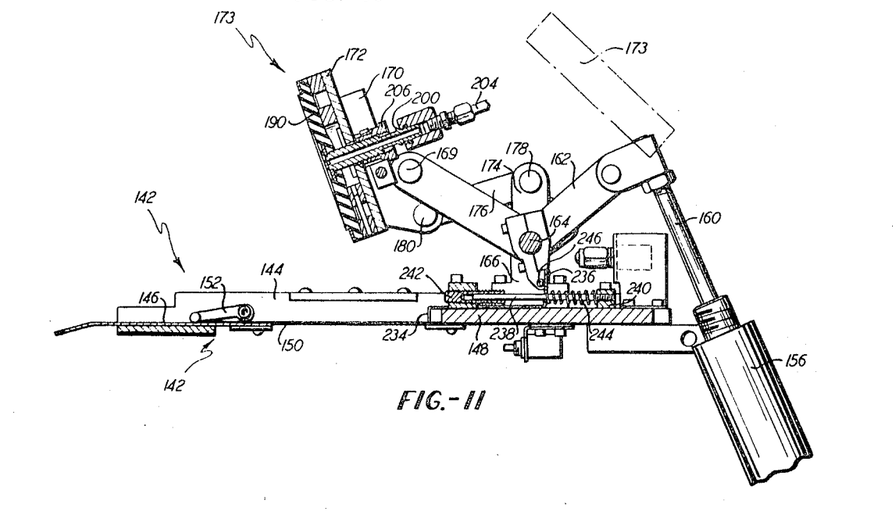
FIGURE 11 is a section taken on the line 11—11 of FIGURE 10.

An air actuated motor 156 is pivoted to the main frame 10 on a pin 158. The piston rod 160 of the motor 156 is pivoted to the back of a two armed lever 162. The lever 162 is secured in its middle to one end of a shaft 164 that is rotatably mounted in trunnions 166 secured to the plate 148. An arm 168 is secured to the other end of the shaft 164 and extends forwardly thereof. The front ends of the lever 162 and the arm 168 are pivotally connected by pins 169 to ears 170 that are secured to a plate 172 of a work holder 173. An arm 174 is secured to the shaft 164 inwardly of each trunnion 166. A link 176 is pivoted to each arm 174 by a pin 178 and to each ear 170 by a pin 180, the pins 180 being located rearwardly of the pins 169.

Figure 12:
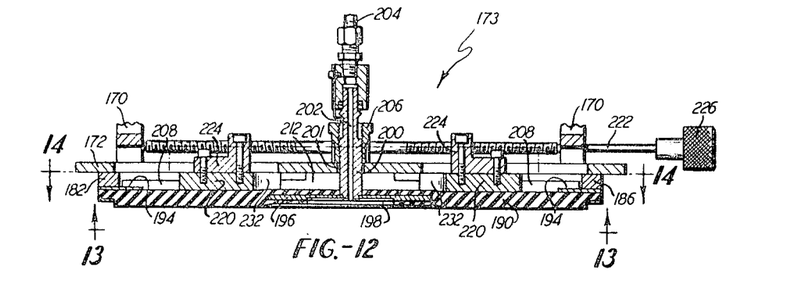
FIGURE 12 is a section of a work holder.
Figure 13:
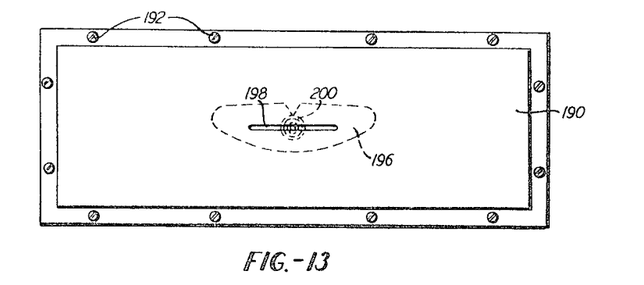
FIGURE 13 is a view taken on the line 13—13 of FIGURE 12.
Figure 14:
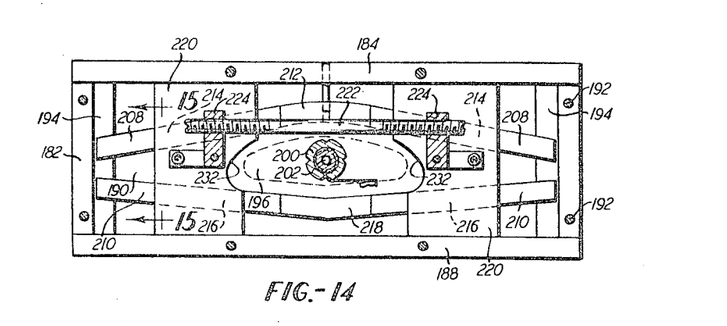
FIGURE 14 is a view of a contouring arrangement taken on the line 14—14 of FIGURE 12.

Referring to FIGURES 12, 13 and 14, bars 182, 184, 186 and 188, secured to the bottom of the plate 172, define a rectangular opening beneath the plate 172. A pad 190, made of a resilient deformable material such as rubber, is secured to the bottoms of the bars 182, 184, 186 and 188 by screws 192. A ledge 194 is clamped between the bars 182 and 186 and the pad 190, the ledges 194 extending inwardly of the bars 182 and 186. An insert 196, made of a rigid material such as steel, is embedded in the pad 190. A slot 198 is cut from the underside of the pad 190 into the insert 196. A pad drawing member, that takes the form of a nozzle 200, extends through an opening 201 in the plate 172 and a clearance opening in the portion of the pad 190 above the insert 196 and is welded to the insert. A hole 202, extending through the nozzle 200, is in communication with the slot 198 and with a tube 204 connected to the top of the nozzle. The tube 204 is connected to a source of suction (not shown) such as a vacuum pump. A nut 206 is threaded onto the nozzle 200 and bears against the top of the plate 172. A pair of bars 208 and 210 straddle the ledges 194 with their ends resting on the ledges. The bar 208 has an inwardly concave mid-portion 212 and straight end portions 214 that extend from the mid-portion 212 to the ends of the bars. The end portions 214, which are tangential to the ends of the concave portion 212, are inclined with respect to the longitudinal axis of the pad 190. The bar 210 comprises two straight portions 216 that are inclined outwardly from the ledges 194 and meet at a mid-portion 218. A pair of blocks 220, resting on the pad 190, are located between the bars 184 and 188 for slidable movement in these bars. A rod 222, rotatably mounted in the ears 170, has a left hand thread and a right hand thread thereon. Each thread is screwed into a lug 224 that is secured to each block 220. Thus, rotation of the rod 222 by a knob 226 secured thereto will cause unitary movement of the blocks 220 toward or away from each other. Each block 220 has grooves 228 and 230 (FIGURE 15) in its bottom. The grooves 228 are inclined similarly to and receive the portions 214 of the bar 208. The grooves 230 are inclined similarly to and receive the portions 216 of the bar 210. Each block 220 has an inwardly facing concave surface 232.

Referring to FIGURES 10 and 11, a pair of gauge fingers 234, resting on the mask 150, extend convergently and rearwardly from the mask over the plate 148 where they are joined by an upwardly extending flange 236. A rod 238, extending through the flange 236, is secured at its back to a block 240 that is bolted to the plate 148. The front of the rod 238 is received in a sleeve 242 that is secured to the plate 148. A compression spring 244, entwined on the rod 238 and extending between the block 240 and the flange 236, acts to yieldably urge the gauge fingers 234 forwardly with the flange 236 bearing against a finger 246 that is rigidly secured to the shaft 164.

Referring to FIGURES 1 and 10, a housing 248 secured to one of the bars 144 has a socket 250 therein that receives a compression spring 252. The spring 252 extends upwardly of the socket 250 and is in registry with a lug 254 that is secured to one of the links 176 when the links 176 are in the FIGURE 1 position.

In the idle condition of the machine: the piston rod 18 is retracted into the motor 14 so that the sub-frame 24 is swung into a lowered position about the axes of the pins 26; the piston rod 34 is projected out of the motor 32; the piston rod 76 is projected out of the motor 74; the piston rod 160 is projected part way out of the motor 156 with no pressurized air entering the motor 156 so that the pad 190 is in the intermediate position shown in FIGURE 1 with the lug 254 resting on the spring 252; and no suction is being applied through the tube 204.

A block of thermoplastic coating material, that is solid at ambient temperature, becomes molten and adherent when heated above a predetermined temperature and reverts to its solid condition when cooled below the predetermined temperature, is placed on grids 256 (FIGURE 5) that form a part of the tank 12. Heaters such as the electric heaters 258, 260 and 262 (FIGURE 2) melt the block of coating material so that the molten adhesive flows into the tank to such a level as to cover the parts shown in FIGURE 4 (see FIGURE 3). The molten coating material gravitates through the port 54, around the ball valve 58, through the sleeve 56, the tube 42, the block 38, the tube 44, the ports 92, the annular chamber 94 and the port 112 into the passage 114.

A counter base 264 (FIGURES 16 and 16A) is deposited on the mask 150 in such a manner that it covers the mask opening 154. The gauge fingers 234 help to properly locate the counter base 264 on the mask 150.

Figure 17:
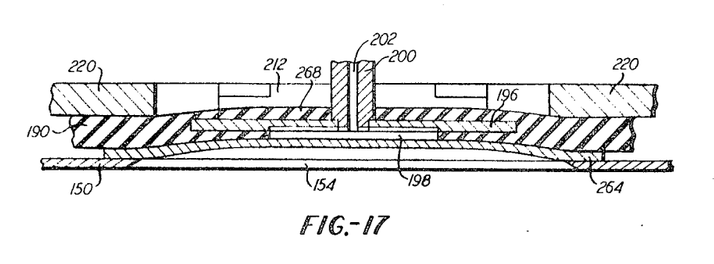
FIGURE 17 is a representation of a workpiece in the machine later in the machine cycle.

The motor 156 is now actuated to cause the piston rod 160 to be projected further out of this motor to thereby overcome the force of the spring 252 and lower the pad 190 against the mask 150 and the counter base 264 with the hole 202 located above the center of the mask opening 154 as indicated in FIGURE 17. The abutment of the plate 172 against flanges 266 (FIGURE 10) that are secured to the side bars 144 limits the extent of downward movement of the pad 190. During the downward movement of the pad 190, the finger 246 moves the flange 236 rearwardly to thereby move the gauge fingers 234 rearwardly out of engagement with counter base 264.

At the same time as the motor 156 is actuated, the vacuum pump associated with the tube 204 is caused to apply an upward suction force through the hole 202 and the slot 198. The nut 206 had previously been manipulated to raise the insert 196 and draw the portion of the pad 190 that is now above the mask hole 154 and within the contouring arrangement formed by the inner peripheries of the surface 232 of the blocks 220 and the inner peripheries of the portions of the bars 208 and 210 that extend between the blocks 220 into an upwardly concave mound 268 as shown in FIGURE 17. The periphery of the mound 268 is determined by the inner periphery of the contouring arrangement. The rod 222 had been previously manipulated to space the blocks 220 the desired distance. Due to the inclination of the portions 214 of the bar 208 and the portions 216 of the bar 210, a movement of the blocks 220 toward each other causes the bars 208 and 210 to have relative sliding motion with respect to the grooves 228 and 230 of the blocks 220 and move towards each other and a movement of the blocks 220 away from each other causes the bars 208 and 210 to move away from each other. The turning on of the suction force through the hole 202 and the slot 198 causes the portion of the counter base 264 that is below the mound 268 and above the mask opening 154 to be sucked upwardly and bear against the bottom of the mound as indicated in FIGURE 17.

After this, the motors 14, 32 and 74 are concomitantly actuated to thereby project the piston rod 18 out of the motor 14, retract the piston rod 34 into the motor 32 and retract the piston rod 76 into the motor 74.

The actuation of the air operated motor 14 causes the sub-frame 24 to be yieldably urged upwardly in a clockwise direction (FIGURE 3) about the axes of the pins 26 to thereby yieldably urge the applicator 98 and the roll 136 against the bottom of the mask 150 in a location that is forward of the counter base 264.

The actuation of the motor 32 causes the sleeve 52 to move rearwardly which in turn causes the ball valve 58 to seat against the valve seat 60 and thereby block the port 54. The actuation of the motor 74 causes the applicator mount 78 to move rearwardly in the sub-frame 24 to thereby move the applicator 98 and the roll 136 rearwardly in a work stroke with the sleeve 88 sliding rearwardly on the tube 44. During the rearward movement of the applicator 98, the rearward movement of the sleeve 52 causes coating material to be pumped from the sleeve 52 through the tube 46, the block 38, the tube 48, the ports 92, the annular chamber 94, the port 112, the passage 114, around the unseated ball valve 126 (which is now forced upwardly against the pin 130), and through the cut-out 116, the passages 118, 120 and 122, the cut-out 124 and the space 108 onto the mask 150 immediately to the rear of the scraping edge 108. The roll 136, during the rearward movement of the applicator 98, is yieldably forced upwardly against the mask 150 by the springs 138. The abutment of a nut 270 (FIGURES 3 and 5), that is secured to the front of the piston rod 34, with the stop member 70 determines the end of the stroke of the piston rod 34 and of the pumping movement of the sleeve 52.

During its work stroke the applicator 98 continuously extrudes molten coating material through the space 110 against the thin, flexible mask 150, an electric heating cartridge 272 (FIGURES 5 and 6) helping to maintain the coating material molten during its passage through the applicator. As the coating material is extruded it is scraped along the mask undersurface by the scraping edge 108 of the applicator 98, this scraping action being augumented due to the applicator being yieldably urged upwardly by the motor 14. During its work stroke the applicator straddles and moves under and across the mask opening 154 and applies the coating material onto the counter base 264 to fill the space between the mask opening 154 and the bottom of the counter base 264 with a coating 274 (FIGURES 18 and 18A) of coating material, which coating adheres to the counter base to form a counter 276. The coating 274 is located is inwardly of the peripheral edges of the counter base and varies in thickness from a minimum at the periphery of the coating to a maximum at the center of the coating so as to provide the feather edge which is desired in counters.

It is desired to make the mask 150 as thin as feasible so as to minimize the thickness of the periphery of the coating. Because of the inherent flexibility of such a thin mask, it has a tendency to buckle during the movement of the applicator 98 in its work stroke. The roll 136, engaging the mask 150 before the applicator 98 during the work stroke under the yieldable force afforded by the motor 14 and the springs 138 to apply pressure against the mask, tends to minimize this undesired buckling of the mask.

Figure 18:
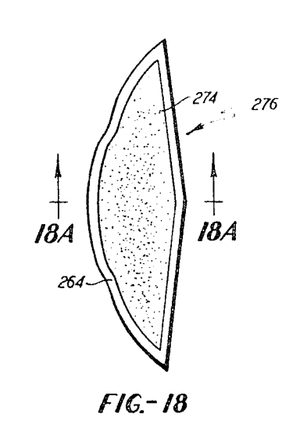
FIGURE 18 is a representation of the workpiece as it appears at the completion of the machine cycle.
Figure 18A:
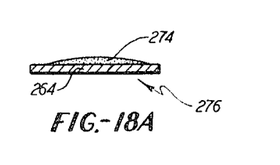
FIGURE 18A is a section taken on the line 18A—18A of FIGURE 18.

As indicated in FIGURES 18 and 18A, the periphery of the coating 274 is generally complementary to the periphery of the counter base 264. To achieve this complemental relationship for the particular counter base used, the rod 222 had been adjusted, as described above, to cause the blocks 220 and the bars 208 and 210 to assume the desired contour to provide the desired peripheral contour of the mound 268. The manipulation of the nut 206, as described above, serves to determine the maximum thickness of the coating 274.

After the completion of the work stroke of the applicator 98 and the roll 136, the motor 14 is actuated to lower the sub-frame 24 to its idle position, the motor 32 is actuated to return the sleeve 52 to its idle position and the motor 74 is actuated to return the applicator mount 78 to its idle position. At the same time, the motor 156 is actuated to retract the piston rod 160 an amount greater than the position assumed by this piston rod in the idle condition of the machine. Because of the construction of the lever 162, the arm 168 and the links 176, this retraction of the piston rod 160 causes the pad 190 to swing clockwise, as seen in FIGURE 11, about 120 degrees to the position shown in phantom with the pad facing upwardly. The movement of the pad 190 from the solid FIGURE 11 position to the phantom FIGURE 11 position enables the suction force in the hole 202 to lift the counter 276 from the mask 150 and enables the counter to move with the pad 190 to the phantom position where the vacuum force entering the hole 202 is shut off so that the counter 276 may drop off the pad 190 onto a conveyor (not shown) which transports it to a storage area. The motor 156 is now actuated to return the pad 190 to its idle position.

Shortly after removal from the mask 150, the coating 274 solidifies so that the counter 276 may be stored until ready for use. The counter at this time has the shape shown in FIGURES 18 and 18A. Subsequently the counter is sewed to the interior of the heel portion of a shoe upper with the coating 274 facing the upper. The counter is then heated to render the coating 274 flaccid and moldable. While the coating is in its soft and moldable condition, the upper is mounted on a last and presented to a heel lasting machine wherein stresses are imparted to cause the heel portion of the upper and the flaccid and moldable counter to conform to the heel portion of the last. While these stresses are maintained the heel portion of the upper margin is wiped against an insole located on the last bottom and is secured to the insole. The stresses are released after the counter has cooled sufficiently to render the coating rigid and shape sustaining.

Figure 19:
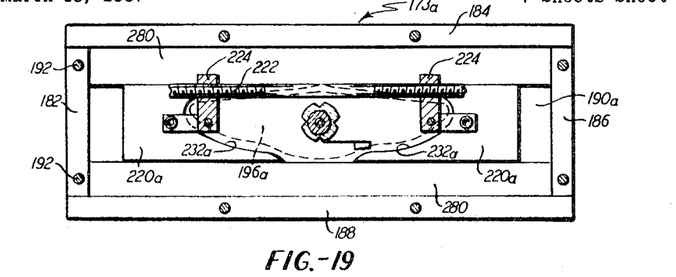
FIGURE 19 is a view of a modified contouring arrangement.

FIGURE 19 shows an alternative form of work holder 173a. In this case the lugs 224 are secured to blocks 220a and the blocks 220a are slidable between bars 280 above a resilient deformable pad 190a having a steel insert 196a embedded therein. The contour of the periphery of the coating is defined by the inwardly facing surfaces 232a of the blocks 220a and the portions of the inwardly facing surfaces of the bars 280 that extend between the surfaces 232a, and this contour is adjusted by rotating the rod 222. In all other respects the work holder 173a is identical to the work holder 173.

Figure 20:
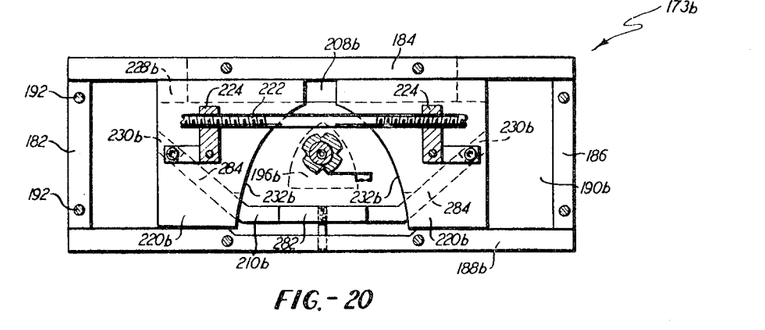
FIGURE 20 is a view of another modified contouring arrangement.

FIGURE 20 shows a work holder 173b used when making box toes instead of counters. In this case the lugs 224 are secured to blocks 220b. The blocks 220b are slidable between the bar 184 and a bar 188b above a resilient deformable pad 190b having a steel insert 196b embedded therein. A straight bar 208b is secured to the bar 184 and extends between the inwardly facing surfaces 232b of the blocks 220b. The bar 208b is slidably received in grooves 228b in the bottoms of the blocks 220b. A bar 210b has a central straight portion 282 and inclined side portions 284 that are slidably received in grooves 230b in the bottoms of the blocks 220b. In all other respects the work holder 173b is identical to the work holder 173.

When making box toes with the work holder 173b, the coating material is extruded directly onto the inner surface of the toe portion of a shoe upper to form the box toe. The upper is placed on the mask 150 over the mask opening 154 and the machine goes through a cycle similar to that described above. However, the vacuum force through the hole 202 is cut off at the same time as the work holder 173b commences its rise from the mask at the completion of the work stroke of the applicator 98 and the roll 136 so that the coated upper does not rise with the applicator but remains on the mask from which it is removed by the operator. At the end of the work stroke of the applicator 98 and the roll 136, the work holder 173b is moved by the motor 156 to the solid line position shown in FIGURE 11 and not the phantom position.

With the work holder 173b, the contour of the periphery of the coating is defined by the inwardly facing surfaces of the bars 208b and 210b and the inwardly facing surfaces 232b of the blocks 220b. This contour is adjusted by rotating the rod 222 to move the blocks 220b toward or away from each other. The movement of the blocks 220b toward and away from each other respectively causes the bar 210b, because of the inclined sides 284 of the bar and the inclined grooves 230b in the blocks 220b, to move inwardly or outwardly.

We claim:

1. A mechanism for applying a coating to a workpiece having a predetermined contour and a predetermined cross-sectional configuration comprising: a mask, adapted to support the workpiece, having an opening corresponding in shape to said predetermined contour; a pad, made of a resilient deformable material, located above the mask so as to hold the workpiece against the mask with the pad above the mask opening; a contouring arrangement, located on top of the pad above the mask opening, defining an inner periphery whose contour is complementary to the mask opening; means for drawing the portion of the pad that is above the mask opening and that lies within the inner periphery of the contouring arrangement upwardly within the contouring arrangement into an upwardly concave mound whose cross-section corresponds to said predetermined cross-sectional configuration; means for causing the portion of the workpiece that lies above the mask opening to bear against the bottom of the mound; and means for causing coating material to be applied into the mask opening so that it may fill the space within the mask opening and adhere to said portion of the workpiece.

2. The mechanism as defined in claim 1 wherein the means for causing said portion of the workpiece to bear against the bottom of the mound comprises: means for applying a suction force through the mound against said workpiece portion.

3. The mechanism as defined in claim 1 wherein the means for drawing said pad portion upwardly comprises: a drawing member secured to said pad portion and extending upwardly thereof within the contouring arrangement; and means for raising the drawing member.

4. The mechanism as defined in claim 3 wherein the means for causing said workpiece to bear against the bottom of the mound comprises: a hole extending through the drawing member that is in communication with the bottom of the mound; and means for causing a suction force to be applied upwardly through the hole.

5. The mechanism as defined in claim 1 wherein the means for drawing said pad portion upwardly comprises: a rigid insert embedded in said pad portion; a drawing member secured to said insert and extending upwardly thereof within the contouring arrangement; and means for raising the drawing member.

6. The mechanism as defined in claim 5 wherein the means for causing said workpiece to bear against the bottom of the mound comprises: a hole extending through the drawing member that is in communication with the bottom of the mound; and means for causing a suction force to be applied upwardly through the hole.

7. The mechanism as defined in claim 5 further comprising: a plate secured to and extending above the pad; an opening in the plate through which the drawing member extends; and a nut threaded onto the drawing member above the plate and bearing against the top of the plate, said nut serving as the means for raising the drawing member.

8. The mechanism as defined in claim 1 wherein the contouring arrangement comprises: a pair of blocks mounted above the pad for inward movement toward each other and for outward movement away from each other, each of said blocks having an inwardly facing surface; a pair of spaced bars extending between said surfaces; and means for effecting inward-outward movement of the blocks; the inner periphery of the contouring arrangement being defined by said block surfaces and the inner peripheries of said bars.

9. The mechanism as defined in claim 8 further comprising: means so connecting at least one of the bars and the blocks as to effect inward movement of said one bar towards the other bar in response to inward movement of the blocks and to effect outward movement of said one bar away from the other bar in response to outward movement of the blocks.

10. The mechanism as defined in claim 9 wherein the last mentioned means comprises: a groove in each block that slidably receives an end of said one bar, each of said grooves and bar ends being so inclined with respect to the axis of inward-outward movement of the blocks as to move away from said axis as it moves away from the block with which it is associated and approaches the other of said blocks.

11. A mechanism for applying a coating to a workpiece having a predetermined contour comprising: a thin flexible mask, adapted to support the workpiece, having an opening corresponding in shape to said predetermined contour; a pad located above the mask so as to hold the workpiece against the mask; an applicator mounted for rearward movement in a work stroke along the bottom of the mask and beneath the pad in such a path as to cross the mask opening; means for depositing coating material in position to be intersected by the applicator during the work stroke to thereby apply the coating material through the mask opening onto the portion of the workpiece lying above the mask opening; and a presser member mounted rearwardly of the applicator for movement in unison with the applicator so constructed as to bear against the bottom of the mask during said work stroke.

12. The mechanism as defined in claim 11 further comprising: means for yieldably urging the presser member upwardly against the mask during the work stroke.

13. The mechanism as defined in claim 11 further comprising: an applicator mount; means mounting the applicator to the applicator mount, said applicator including a blade having an upwardly directed scraping edge that bears against the mask during the work stroke; bracket means mounted to the mount for heightwise movement; a roll, which constitutes said presser member, rotatably mounted to the bracket means in a location that is rearward of the blade, spring means for yieldably urging the bracket means upwardly; and means for causing rearward movement of the applicator mount to thereby effect said work stroke.

References Cited

UNITED STATES PATENTS 2,963,964    12/1960    Klump _____________ 101—123

WALTER A. SCHEEL, Primary Examiner

JOHN P. McINTOSH, Assistant Examiner

U.S. Cl. X.R.

101—123, 126; 118—503